(12) United States Patent
Kaplan et al.

(10) Patent No.: US 11,111,370 B2
(45) Date of Patent: Sep. 7, 2021

(54) PROMOTED MEMBRANE FOR SINGLE-PLY ROOFING

(71) Applicants: STEPAN COMPANY, Northfield, IL (US); CARLISLE INTANGIBLE COMPANY, Carlisle, PA (US)

(72) Inventors: Warren Kaplan, Libertyville, IL (US); Sarah Wolek, Arlington Heights, IL (US); Mike Heishman, Mechanicsburg, PA (US); William Schneider, Mechanicsburg, PA (US)

(73) Assignees: STEPAN COMPANY, Northfield, IL (US); CARLISLE INTANGIBLE COMPANY, Carlisle, PA (US)

( * ) Notice: Subject to any disclaimer, the term of this patent is extended or adjusted under 35 U.S.C. 154(b) by 0 days.

(21) Appl. No.: 16/594,556

(22) Filed: Oct. 7, 2019

(65) Prior Publication Data
US 2020/0032043 A1 Jan. 30, 2020

Related U.S. Application Data

(63) Continuation of application No. PCT/US2018/026075, filed on Apr. 4, 2018.

(60) Provisional application No. 62/483,528, filed on Apr. 10, 2017.

(51) Int. Cl.
| C08L 23/16 | (2006.01) |
| E04D 1/20 | (2006.01) |
| E04D 1/34 | (2006.01) |
| C08K 5/00 | (2006.01) |
| C08K 5/053 | (2006.01) |
| C08K 5/092 | (2006.01) |

(52) U.S. Cl.
CPC .............. *C08L 23/16* (2013.01); *E04D 1/20* (2013.01); *E04D 1/34* (2013.01); *C08K 5/0025* (2013.01); *C08K 5/053* (2013.01); *C08K 5/092* (2013.01); *E04D 2001/3435* (2013.01)

(58) Field of Classification Search
CPC ...................................................... C08L 23/16
See application file for complete search history.

(56) References Cited

U.S. PATENT DOCUMENTS

| 4,343,667 | A | 8/1982 | Hollis |
| 4,480,012 | A | 10/1984 | Fieldhouse |
| 4,649,686 | A | 3/1987 | Backenstow et al. |
| 4,996,812 | A | 3/1991 | Venable |
| 5,096,743 | A | 3/1992 | Schoenbeck |
| 5,242,727 | A | 9/1993 | Briddell et al. |
| 5,286,798 | A | 2/1994 | Davis et al. |
| 5,407,989 | A | 4/1995 | Davis et al. |
| 5,700,538 | A | 12/1997 | Davis et al. |
| 5,849,133 | A | 12/1998 | Senderling et al. |
| 5,872,203 | A | 2/1999 | Wen et al. |
| 5,951,796 | A | 9/1999 | Murray |
| 6,037,413 | A * | 3/2000 | Kitahara ............. C08L 23/16 525/168 |
| 6,093,354 | A | 7/2000 | Hubbard et al. |
| 6,133,378 | A | 10/2000 | Davis et al. |
| 6,615,892 | B2 | 9/2003 | Hubbard et al. |
| 6,632,509 | B1 * | 10/2003 | Davis .................. C08L 23/16 428/147 |
| 6,742,313 | B2 | 6/2004 | Ritland et al. |
| 6,866,732 | B2 | 3/2005 | Hubbard et al. |
| 6,938,386 | B2 | 9/2005 | Ritland et al. |
| 7,256,235 | B2 | 8/2007 | Pelton |
| 7,622,187 | B2 | 11/2009 | Clarke et al. |
| 2014/0044935 | A1 | 2/2014 | Miller |
| 2014/0127448 | A1 | 5/2014 | Miller et al. |

FOREIGN PATENT DOCUMENTS

EP 0894815 A1 2/1999

OTHER PUBLICATIONS

PCT International Search Report and Written Opinion of the International Searching Authority dated Jul. 5, 2018 in corresponding Application No. PCT/US2018/026075, 7 pages.

* cited by examiner

*Primary Examiner* — Ana L. Woodward
(74) *Attorney, Agent, or Firm* — Dillworth IP, LLC

(57) ABSTRACT

A promoted membrane suitable for use in single-ply roofing applications is disclosed. The membrane comprises EPDM rubber and 0.1 to 10 wt. % of an adhesion promoter. The promoter comprises a polyester resin having a hydroxyl number within the range of 28 to 250 mg KOH/g, a content of terephthalate recurring units within the range of 40 to 65 wt. % based on the amount of polyester resin, and a glass-transition temperature within the range of 40° C. to 80° C. Roofing systems comprising the promoted EPDM membranes are also disclosed. Compared with an unpromoted membrane, the promoted membranes provide a substantial and unexpected boost in peel strength such that the roofing systems resist weather-induced failure of the bond between the roofing membrane and the roof substrate. The invention helps roofers minimize or limit the aggravation and cost of warranty claims from customers whose buildings and contents may otherwise be damaged or destroyed by exposure to wind and/or rain.

17 Claims, No Drawings

PROMOTED MEMBRANE FOR SINGLE-PLY ROOFING

JOINT RESEARCH AGREEMENT

The presently claimed invention was made by or on behalf of the below listed parties to a joint research agreement. The joint research agreement was in effect on or before the effective filing date of the claimed invention and the claimed invention was made as a result of activities undertaken within the scope of the joint research agreement. The parties to the joint research agreement are 1) Stepan Company and 2) Carlisle Construction Materials LLC.

FIELD OF THE INVENTION

The invention relates to single-ply roofing membranes, and in particular, to a membrane having improved adhesion properties.

BACKGROUND OF THE INVENTION

Single-ply roofing membranes are strong, flexible sheets of compounded synthetic rubber that have long-lasting durability. The membranes are used most frequently for flat or low-slope roofs. Most commonly, the rubber is EPDM (ethylene-propylene-diene monomer rubber), a thermoset polymer.

Roofing membranes are attached to substrates, typically a layer of rigid foam insulation, using mechanical fasteners or more commonly an adhesive. Traditionally, solvent-based adhesives containing tackified, rubbery copolymers have been used to bond the membrane to the insulation layer. More recently, however, low-VOC or non-VOC formulations have become more desirable for the environment, but achieving adequate bonding without VOC solvents can be challenging.

In many climates, roofs are subject to high winds or other extreme weather conditions. This puts considerable stress on the bond between the roofing membrane and the roofing substrate, particularly at the membrane-adhesive interface. Unless the bond between the adhesive and the roofing membrane is robust, the bond can fail resulting in water damage to the building contents and a need for expensive repairs. Most roofing membranes have relatively low surface energy, however, so they do not bond well to polar substances, including many polyurethane adhesives. Consequently, although the bond between the roofing substrate (e.g., polyisocyanurate foam insulation) and the polyurethane adhesive may be able to withstand a high degree of stress, too often the bond between the adhesive and the roofing membrane is relatively weak.

To improve adhesion, the surface of the roof membrane can be embossed or roughened to increase the surface area available for bonding. This approach is often only partially successful and requires extra processing complexity. Another way to improve adhesion is to incorporate a fleece layer into the membrane and then apply adhesive to the fleece layer. This technique is costly, time consuming, and can be used only for thin membranes.

A need remains, therefore, for roofing membranes having improved ability to bond directly to adhesives, especially two-component polyurethane adhesives. A preferred membrane would form a satisfactory bond without a need for surface modification by roughening or embossing and without the need for a fleece layer. The need remains for a smooth (or "bareback") membrane that can be bonded to roof substrates using readily available adhesives, particularly polyurethanes. Ideally, a suitable adhesion promoter could be identified that could be readily incorporated into synthetic rubber using ordinary compounding processes.

SUMMARY OF THE INVENTION

In one aspect, the invention relates to a promoted membrane suitable for use in single-ply roofing applications. The promoted membrane comprises a synthetic rubber and an adhesion promoter. The synthetic rubber is ethylene-propylene-diene rubber (EPDM). Incorporated within the rubber is 1 to 10 wt. %, based on the amount of promoted membrane, of an adhesion promoter. The promoter comprises a polyester resin having a hydroxyl number within the range of 28 to 250 mg KOH/g, a content of terephthalate recurring units within the range of 40 to 65 wt. % based on the amount of polyester resin, and a glass-transition temperature within the range of 40° C. to 80° C.

In another aspect, the invention relates to a roofing system. The roofing system comprises a roof deck, insulation affixed to the roof deck, a promoted membrane as described above, and an adhesive. The adhesive bonds the promoted membrane to the insulation.

Compared with an unpromoted membrane, the promoted EPDM membranes provide a substantial and unexpected boost in peel strength such that the roofing systems resist weather-induced failure of the bond between the roofing membrane and the roof substrate. The invention allows roofers to minimize or limit the aggravation and cost of warranty claims from customers whose buildings and contents may otherwise be damaged or destroyed by exposure to wind and/or rain.

DETAILED DESCRIPTION OF THE INVENTION

In one aspect, the invention relates to a promoted membrane suitable for use in single-ply roofing applications. The membrane comprises EPDM rubber and an adhesion promoter that is incorporated within the rubber. "Single-ply" refers to roofing applications that utilize a generally continuous layer of rubber and one or more compounded additives.

Synthetic rubber suitable for use in making the promoted membranes is ethylene-propylene-diene rubber (EPDM), which is well known in the art and is an article of commerce. EPDM is commercially available in different grades from ExxonMobil, Dow, Lanxess, and Lion, among other manufacturers and suppliers. EPDM is a thermoset rubber, meaning that it cannot be melt-processed after it has been fully cured.

EPDM is a dense, relatively inert, moisture-resistant material that, in many ways, is synonymous with single-ply roofing. Preferably, the EPDM has a tensile strength of at least 1000 psi or at least 1400 psi by ASTM D-412-68, an elongation of at least 250% or at least 300% by ASTM D-412-68, a Die C tear resistance of at least 100 lb./in.-min. or at least 125 lb./in.-min., and a Shore A hardness within the range of 45 to 75 or 50 to 70 units. For other desirable properties of the EPDM, see U.S. Pat. No. 4,343,667, the teachings of which are incorporated herein by reference, particularly at col. 10.

The EPDM rubber is compounded with other components and processed into thin sheets. In preferred aspects, the rubber sheets have thicknesses within the range of 1/32" to 1/4", or 1/16" to 1/8" or 1/16" to 3/32". The width of the roll can be relatively small, e.g., 4 feet or relatively large, e.g., 40 feet or more. For use on large buildings, a 40'-wide sheet is particularly desirable. Methods of manufacturing suitable synthetic rubber sheets are known. For some useful methods of manufacturing EPDM membranes, see U.S. Pat. Nos. 4,343,667; 5,096,743; 5,286,798; 5,407,989; 6,093,354; 6,615,892; and 6,866,732, the teachings of which are incorporated herein by reference.

An adhesion promoter is incorporated within the EPDM rubber. The amount of adhesion promoter used is 1 to 10 wt. %, 1.5 to 8 wt. %, or 2 to 5 wt. %, based on the amount of promoted membrane.

The adhesion promoter comprises a polyester resin. Suitable polyester resins have terephthalate recurring units (from terephthalic acid, dimethyl terephthalate, or other terephthalate sources) and diol recurring units. The polyester resin has a content of terephthalate recurring units within the range of 40 to 65 wt. %, or 45 to 60 wt. %, based on the amount of polyester resin. The resins may have other aromatic (e.g., isophthalic acid, phthalic anhydride) or aliphatic (adipic acid, succinic acid, suberic acid, sebacic acid) diacid recurring units in addition to the terephthalate units. The diol recurring units are those commonly used to make hydroxy-functional polyester resins. They include, for example, ethylene glycol, propylene glycol, 1,3-propanediol, 1,4-butanediol, 1,5-pentanediol, 3-methyl-1,5-pentanediol, 2-methyl-1,3-propanediol, neopentyl glycol, 1,4-cyclohexanedimethanol, diethylene glycol, and the like, and combinations thereof.

The polyester resin has a hydroxyl number within the range of 28 to 250 mg KOH/g, 40 to 230 mg KOH/g, or 56 to 112 mg KOH/g.

The polyester resin has a glass-transition temperature within the range of 40° C. to 80° C. or 50° C. to 70° C.

In some aspects, the polyester resin comprises 20 to 50 wt. %, based on the amount of polyester resin, of recurring units of a branched diol. Suitable branched diols include, for example, propylene glycol, 2-methyl-1,3-propanediol, 3-methyl-1,5-pentanediol, neopentyl glycol, and the like. Neopentyl glycol is particularly preferred.

In some aspects, the polyester resin further comprises at least 1 wt. % of recurring units of a hydroxy-functional or acid-functional crosslinker. These crosslinkers have average hydroxyl or acid functionalities greater than 2. Suitable acid-functional crosslinkers include, for example, trimellitic anhydride, 1,3,5-benzenetricarboxylic acid, and the like. Trimellitic anhydride is preferred. Suitable hydroxy-functional crosslinkers include, for example, trimethylolpropane, trimethylolethane, glycerol, pentaerythritol, dipentaerythritol, sorbitol, and the like. Trimethylolpropane is preferred.

In some aspects, the polyester resin has an average hydroxyl functionality within the range of 2 to 6 or 2.5 to 5.5.

In some aspects, the polyester resin has an acid number less than 15 mg KOH/g, or less than 10 mg KOH/g, or less than 5 mg KOH/g.

In some aspects, the promoted membrane further comprises, in addition to the adhesion promoter, one or more additives selected from pigments, mineral fillers (e.g., zinc oxide, titanium dioxide, calcium carbonate, silicas, talc, mica), carbon blacks, clays, cryogenically ground rubber, ground coal, processing oils (e.g., low volatility paraffinic or naphthenic processing oils), waxes, stearic acid, vulcanizing agents (especially elemental sulfur and organosulfur compounds), vulcanization promoters (e.g., benzothiazoles), activators, accelerators (e.g., organic peroxides, dialkyldithio-carbamate salts or thiuram monosulfides), green strength promoters (e.g., alumina trihydrate, colemanite, and combinations thereof; see U.S. Pat. No. 5,407,989), antioxidants, plasticizers, fire retardants, and combinations thereof. Additional suitable additives are described in U.S. Pat. Nos. 5,407,989; 5,700,538; and 6,133,378, the teachings of which are incorporated herein by reference. The amount of additive included can vary widely and depends on many factors, including the nature of the additive, the type and thickness of the membrane, the intended use, and other factors within the skilled person's discretion. For instance, only a tiny amount (e.g., ppm levels) of an accelerator or vulcanizing agent might be suitable, whereas a large amount (5-30 wt. %) of an inorganic filler could be tolerated. In general, additives may be included in an amount within the range of 10 ppm to 30 wt. %, 100 ppm to 25 wt. %, or 0.1 wt. % to 20 wt. %, based on the amount of promoted membrane.

The adhesion promoter and any additives can be incorporated into the EPDM rubber using conventional compounding equipment (e.g., internal mixers, Brabender® mixers, Banbury® mixers, sigma blade mixers, two-roll mills, extruders, rolling mills or masticators) as is known in the art from, for instance, U.S. Pat. Nos. 5,286,798 and 5,407,989, the teachings of which are incorporated herein by reference.

In some aspects, a masterbatch of EPDM rubber pellets, processing oil, and additives other than a curing package (e.g., carbon black, titanium dioxide, colorants, fire retardants, etc.) are first blended together. The adhesion promoter can be included in this masterbatch. The masterbatch is subsequently combined with the curing package under conditions that avoid premature curing of the product. If desired, the adhesion promoter can be introduced along with the curative package. The final cure can be effected by ambient solar energy after the membrane has been installed on the roof.

In some aspects, the promoted membrane exhibits at least a 25%, 35%, 50%, or 100% improvement in adhesion to a roof substrate when used in combination with a two-component polyurethane adhesive when compared with the adhesion of a similar membrane made without the adhesion promoter.

Compared with an unpromoted EPDM membrane, the promoted membranes provide a substantial and unexpected boost in peel strength such that the roofing systems resist weather-induced failure of the bond between the roofing membrane and the roof substrate. The invention allows roofers to minimize or limit the aggravation and cost of warranty claims from customers whose buildings and contents may otherwise be damaged or destroyed by exposure to wind and/or rain. Table 1 below illustrates the benefit for peel strength from including an adhesion promoter as described herein within the membrane.

The adhesion promoter provides the benefits discussed above without adversely affecting other important properties of the membranes, including Shore A hardness, tensile strength, tear strength, Mooney scorch, Mooney viscosity at 100° C., and the like.

In addition to use for roofing, the promoted EPDM membranes can be used as components of a wall structure or other building elements.

In another aspect, the invention relates to a roofing system. The roofing system comprises a roof deck, insulation affixed to the roof deck, a promoted EPDM membrane as described above, and an adhesive. The adhesive bonds the promoted membrane to the insulation. A typical roofing system of this type (with a roof deck, insulation, and a conventional EPDM membrane) is illustrated in U.S. Pat.

Nos. 4,649,686 and 7,622,187, the teachings of which are incorporated herein by reference.

The roof deck can be constructed from any suitable material, especially metal, wood, plywood, chipboard, carbon fiber, concrete, ceramics, plastics, or the like. The insulation is typically a rigid cellular material such as a rigid polyurethane foam or rigid polyisocyanurate foam.

The adhesive can be any material capable of forming a satisfactory bond between the promoted EPDM membrane and the insulation. Preferred materials include polyurethanes and urea-urethanes (see, e.g., U.S. Pat. Nos. 5,872,203; 5,951,796; and 6,742,313 and U.S. Publ. Nos. 2014/0044935 and 2014/0127448), epoxy systems, melamines and the like. Two-component polyurethanes are particularly preferred. Tackified rubbery polymer adhesives, such as those described in U.S. Pat. Nos. 4,480,012; 5,242,727; and 7,256,235, can also be used. In preferred aspects, the adhesive is solvent-free and low- (i.e., less than 5 wt. % or less than 1 wt. %) or zero-VOC.

In some aspects, the membrane is cleaned prior to application of the adhesive to remove mica or other dusting particles from the membrane. These particles are often applied to keep the membrane from sticking to itself when it is rolled and stored. The cleaner can be a dilute aqueous surfactant solution.

In some less-preferred aspects, the membrane is treated with a primer, such as a low-VOC primer as described in U.S. Pat. No. 5,849,133. However, a primer is generally used with solvent-based adhesives, while the inventive promoted membranes are preferably used with low-VOC or zero-VOC polyurethane adhesives.

In preferred aspects, the EPDM membrane is a "bareback" or smooth-surface membrane. Traditionally, such membranes have been difficult to adhere to insulation and other components of the roofing system. Consequently, membranes having a "fleeceback" structure have been used (see, e.g., U.S. Pat. Nos. 4,996,812; 6,742,313; 6,938,386; and 7,622,187). The inventive promoted membranes can be either bareback or fleeceback, with the less-expensive bareback membranes being preferred.

Preferred Adhesive Composition

In one aspect, the adhesive is a non-foaming, low-VOC two-part polyurethane adhesive that combines an isocyanate-containing portion or "A side" with an isocyanate-reactive portion or a "B side" at the point of application. Advantageously, the two portions can be easily combined using, for example, conventional mixing or spraying equipment to prepare the polyurethane adhesive.

In a preferred aspect, the adhesive comprises a reaction product of (a) a "B side" comprising (i) from 5 wt. % to 20 wt. % non-polyester polyol; (ii) from 80 wt. % to 95 wt. % aliphatic polyester polyol having a hydroxyl number within the range of 150 to 300 mg KOH/g and an average hydroxyl functionality of 1.8 to 2.2; and (iii) less than 1 wt. % of a urethane catalyst, based on the weight of the B-side components; and (b) an "A side" comprising (i) from 80 wt. % to 92 wt. % of at least one polyisocyanate, and (ii) from 8 wt. % to 20 wt. % of a non-reactive plasticizer based on the weight of the A-side components; wherein the "B side" and "A side" are reacted at a volume ratio of about 1:1, and the adhesive is formulated at an NCO/OH index within the range of 0.90 to 1.10.

The isocyanate-reactive "B side" comprises an aliphatic polyester polyol, a non-polyester polyol, and a urethane catalyst. By "non-polyester polyol," we mean a polyol that does not have an ester moiety. The aliphatic polyester polyol is the reaction product of an aliphatic dicarboxylic acid, or an anhydride or lactone derivative thereof, reacted with an excess of hydroxyl-containing material. Suitable aliphatic dicarboxylic acids for use herein include succinic acid, fumaric acid, maleic acid, adipic acid, oxalic acid, glutaric acid, azelaic acid, sebacic acid, dimer acids, and mixtures thereof. Suitable hydroxyl containing materials comprise ethylene glycol, propylene glycol, 1,3-butanediol, 1,4-butanediol, 1,5-pentanediol, 1,6-hexanediol, 2-methyl-1,3-propanediol, neopentyl glycol, diethylene glycol, dipropylene glycol, triethylene glycol, 1,3-propanediol, pentaerythritol, glycerol, diglycerol, trimethylolpropane, 1,4-cyclohexanediol, sorbitol, sugars such as sucrose, and other low-molecular-weight polyols such as polyethylene glycols having a molecular weight of about 400 or less. In some aspects, the aliphatic polyester polyol is derived from adipic acid reacted with diethylene glycol.

The aliphatic polyester polyol contains an amount of aliphatic dicarboxylic acid or derivative thereof relative to the amount of hydroxyl-containing material to give an average hydroxyl value of 150 to 300 mg KOH/g, alternatively 200 to 250 mg KOH/g. The aliphatic polyester polyol also has an acid value of less than 2, such as an acid value of 0.05 to 1.8, alternatively 0.10 to 1.5, alternatively 0.20 to 1.0, alternatively 0.5 to 1.0, and an average functionality in the range of 1.8 to 3.0, alternatively 1.8 to 2.5, alternatively 1.8 to 2.2. The aliphatic polyester polyol comprises from 80 wt. % to 95 wt. % of the total B-side portion.

The non-polyester polyol component is a polyol, such as a diol or a triol, or mixtures thereof, having a low molecular weight, such as a molecular weight of 400 or less, and an OH value in the range of 280 to 1830 mg KOH/g. Suitable non-polyester polyols for use herein include ethylene glycol, diethylene glycol, glycerin, triethylene glycol, 1,3-butanediol, 1,4-butanediol, 1,3-propanediol, 1,5-pentanediol, 1,6-hexanediol, 2-methyl-1,3-propanediol, propylene glycol, dipropylene glycol, and mixtures thereof. The non-polyester polyol has a functionality of not higher than 3, preferably about 2. In some aspects, the non-polyester polyol contains primary hydroxyl groups. In some aspects, the non-polyester polyol is ethylene glycol. The non-polyester polyol comprises from 5 wt. % to 20 wt. % of the total B-side portion.

Suitable urethane catalysts are known in the art and include tertiary amines, isocyanate-functional amines, and organometallic compounds, especially organotin compounds such as stannous octoate and dibutyltin dilaurate.

The B-side portion has an overall OH value of at least 250 mg KOH/g, such as an OH value in the range of 250 to 500 mg KOH/g. The B-side portion also has an overall viscosity of less than about 1,000 cP or 800 cP at 25° C. using a Brookfield viscometer with a #3 spindle.

The isocyanate-containing "A side" comprises an isocyanate component, preferably a polyisocyanate component. Suitable polyisocyanates have two or more isocyanate groups. Examples of suitable polyisocyanates include conventional aliphatic, cycloaliphatic, and aromatic isocyanates or mixtures thereof, having a nominal functionality in the range of 2.25 to 3. Specific examples include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and 1,6-hexamethylene diisocyanate; cycloaliphatic diisocyanates such as 1,3- and 1,4-cyclohexane diisocyanate as well as any mixtures of these isomers, isophorone diisocyanate, 2,4- and 2,6-hexahydrotoluene diisocyanate and the corresponding isomeric mixtures 4,4'-2,2'- and 2,4'-dicyclohexylmethane diisocyanate as well as the corresponding isomeric mixtures and aromatic diisocyanates and polyisocyanates such as 2,4- and 2,6-toluene diisocyanate and the corresponding isomeric mixtures, and 2,2'-diphenylmethane diisocyanate and the corresponding isomeric mixtures, mixtures of 4,4'-, 2,4'-, and 2,2-diphenylmethane diisocyanates and polyphenylene polymethylene polyisocyanates (crude MDI).

The isocyanate-containing A-side also comprises at least one plasticizer that is non-reactive with the components in the A-side and B-side portions. In general, suitable plasticizers are those that have no isocyanate-reactive groups, have a high boiling temperature, such as 100° C. or greater, and have a low viscosity of about 75 cP or less at 25° C. Specific examples of plasticizers for use herein include propylene carbonate, TXIB™, available from Eastman, Kingsport, Tenn., DBE® esters, which are various mixtures of dimethyl succinate, dimethyl glutarate, and dimethyl adipate, commercially available from Invista, Wichita, Kans., methyl esters of carboxylic acids, including methyl esters of fatty acids, triethyl phosphate, tris-isopropylchlorophosphate (TCPP), and other non-reactive phosphate esters, and mixtures of any of the foregoing.

The amount of isocyanate and plasticizer present in the A-side depends in part on the OH value of the B-side. In general, the higher the OH value of the B-side, the more plasticizer that should be present in the A-side. A suitable amount of isocyanate is in the range of 80 wt. % to 92 wt. % of the A-side components, and a suitable amount of plasticizer is in the range of 8 wt. % to 20 wt. % of the A-side components. In one aspect, the A-side comprises 85 wt. % to 90 wt. % polyisocyanate and 10 wt. % to 15 wt. % propylene carbonate plasticizer. The A-side has an overall viscosity of 200 cP or less, alternatively 150 cps or less, measured at 25° C. using a Brookfield viscometer with a #3 spindle.

The adhesive compositions are prepared by combining the A-side and the B-side at a volume ratio of about 1:1 and at an NCO/OH index within the range of 0.90 to about 1.10. Preferably, the A-side and the B-side are packaged separately and then combined by mixing the portions together prior to application on a substrate.

The adhesive composition is preferably free of solvents or solvent-free. "Solvent-free" means that the A-side and the B-side and the final polyurethane adhesive contain less than 1 wt. % of solvent, or less than 0.5 wt. % solvent, or less than 0.1 wt. % solvent, or less than 0.01 wt. % solvent, or contain no solvent (have 0 wt. % solvent). "Solvent" means a bulk solubilizing material, typically present in excess in a solution, that evaporates during curing of the adhesive. The polyurethane adhesive also has a low amount of volatile organic compounds (VOCs). By "low amount" or "low VOC," we mean that the final polyurethane adhesive has less than 250 g/L, or less than 150 g/L, or less than 125 g/L of volatile material detected, using standard ASTM test methodologies. The adhesive composition is also non-foaming. By "non-foaming," we mean that the A-side and B-side do not contain any intentionally added reactive or non-reactive blowing agents, including water, that produce a cellular structure within the adhesive. Ambient or atmospheric moisture is not considered a blowing agent.

The following examples merely illustrate the invention; the skilled person will recognize many variations that are within the spirit of the invention and scope of the claims.

Polyester Resin Promoters:

Resin A: A polyester resin having a hydroxyl number of 110 mg KOH/g and based on terephthalic acid (49%), neopentyl glycol (31%), and trimethylolpropane (14%).

Resin B: A polyester resin having a hydroxyl number of 40 mg KOH/g and based on terephthalic acid (47%), neopentyl glycol (45%), and trimellitic anhydride (5%).

Resin C: A polyester resin having a hydroxyl number of 40 mg KOH/g and based on terephthalic acid (61%), neopentyl glycol (26%), ethylene glycol (11%), and trimethylolpropane (1%).

Resin D: A polyester resin having a hydroxyl number of 40 mg KOH/g and based on terephthalic acid (50%), neopentyl glycol (44%), and trimellitic anhydride (6%).

Resin E (comparative): A polyester resin having a hydroxyl number of 295 mg KOH/g and based on isophthalic acid (48%) and trimethylolpropane (46%).

Lab-Scale Evaluation

To evaluate the performance of Resins A-E as adhesion promoters, each was combined with a sample of EPDM at 1.5 wt. % in a laboratory-scale process along with carbon black, colorants, fire retardants, and other conventional additives. The compounded rubber samples were formed into sheets. A curative package was introduced, followed by further compounding under controlled temperature conditions to prevent premature curing. Membrane sheets of 0.06" in thickness were produced.

Low VOC, Two-Component Polyurethane Adhesive

A "B side" portion is made by blending about 90 wt. % of an adipic acid-based diol (hydroxyl number: 225 mg KOH/g) with about 10 wt. % of ethylene glycol and 0.16 wt. % of Dabco® 33LV catalyst (Air Products). The resulting B-side portion has a viscosity of 320 cP at 25° C. The "A side" portion is made by blending 87.5 wt. % of Lupranate® M-20 polymeric MDI and 12.5 wt. % propylene carbonate. The resulting A-side portion has a viscosity of 90 cP at 25° C. The two-component adhesive is produced by reacting the A and B sides at a 1:1 ratio by volume and at an NCO/OH index of about 1.

Adhesion Testing

Adhesion strength testing is performed using a modified version of ASTM D429 Method B. Adhesion samples are prepared by applying about 4.0 to about 4.5 g of the low-VOC adhesive to a plywood substrate that is 0.5 inches thick, 3.2 inches wide, and 6 inches long and adhering an EPDM rubber membrane (containing each of Resins A-E as adhesion promoters) that is 0.06 inches thick, 2.25 inches wide, and at least 6 inches long to the plywood substrate. A 6.5-lb. weight is placed across the top of the adhering sample, and the assembly is allowed to cure for at least 1 hour prior to weight removal. Excess adhesive extending beyond the perimeter of the membrane during the cure process is cut away from the membrane edge prior to adhesion testing.

Adhesion strength testing is performed using an Instron Testing Machine equipped with a 50-lb. load cell and standard tensile test grips (2.25 inches wide). Each membrane-to-substrate sample tested is "pulled" 3 times to 1.25 inches of extension (@ 5 inches/minute), and the data (peak load, peak force, average load and peel strength) for the 3 pulls are recorded and averaged for each sample.

Peak load (expressed in lb.-force) is the maximum stress encountered during the 1.25-inch peeling event. Peak force is the peak load normalized by the sample width and is expressed as lb.-force/inch. Average load is an average of the force required to delaminate between 0.25 inches to 1.25 inches of extension. Peel strength is the average delamination force (from 0.25 inches to 1.25 inches), normalized for sample width. Peel strength is expressed as lb.-force/inch and three values are averaged per sample. See Table 1 for peel strength results. Corresponding values for peel strength in N/m are also reported in Table 1.

TABLE 1

Peel Strength Performance of Promoted EPDM Membranes

| Resin | Wt. % resin in EPDM membrane | OH # (mg KOH/g) | Ave. OH functionality | Tg (° C.) | Peel strength (lb.-f/in.) | Peel strength (N/m) |
|---|---|---|---|---|---|---|
| Control | 0 | — | — | — | 5.7 | 998 |
| A | 1.5 | 110 | 5.5 | 58 | 9.3 | 1630 |
| B | 1.5 | 40 | 2.5 | 59 | 8.2 | 1440 |
| C | 1.5 | 40 | 2.1 | 63 | 7.9 | 1380 |
| D | 1.5 | 40 | 2.4 | 68 | 7.4 | 1300 |
| E* | 1.5 | 295 | 8.3 | 53 | 4.1 | 718 |

*Comparative example

Scale-Up Evaluation

To further evaluate the performance of Resin A as an adhesion promoter, the resin is combined with EPDM at 1.5 wt. % along with carbon black, colorants, fire retardants, and other conventional additives, and the compounded rubber mixture is extruded into a thick sheet. A curative package is introduced, followed by further extrusion and calendering under controlled temperature conditions to prevent premature curing. A single-ply membrane is generated by merging top and bottom portions. The cooled membrane is then rolled with fabric and stored until use.

Wind Uplift Test

Dusted EPDM with or without 1.5 wt. % of polyester resin A is evaluated on a large (12'×24') wind table using the low-VOC, two-component polyurethane adhesive described earlier. Half of the membrane is pulled back to expose the polyisocyanurate insulation board. The board is attached to the roof deck using fasteners spaced at 1-foot intervals (i.e., about one fastener per square foot overall). Adhesive is sprayed onto the exposed half of the insulation board and allowed to sit for 3.5 to 4 minutes prior to embedding the membrane. A push-broom and 150-lb. roller are used to embed the membrane into the adhesive, targeting 3.5-4 minutes for initial crosslinking of the adhesive, and replacing the membrane incrementally. The process is repeated for the other half of the membrane. The deck is allowed to cure overnight under ambient conditions.

Testing begins with application of air pressure from beneath the roof deck at 30 lb./ft$^2$. Pressure increases by 15 lb./ft$^2$ every 60 seconds. The test ends when failure occurs either when the bond between the adhesive and the membrane fails or when the polyisocyanurate insulation board breaks through the fasteners. Results of the wind uplift test appear in Table 2.

TABLE 2

Wind Uplift Test Results

| EPDM | Resin | lb./ft$^2$ at failure |
|---|---|---|
| dusted | A | 270 |
| dusted | none | 150 |

The wind uplift test results are remarkable. The normal result with solvent-based, two-component polyurethane adhesives is about 180 lb./ft$^2$ at failure. Results in the 285 lb./ft$^2$ range can be achieved but normally requires bonding of the EPDM to coverboard or gypsum board rather than direct bonding to the polyisocyanurate insulation.

The preceding examples are meant only as illustrations; the following claims define the inventive subject matter.

We claim:

1. A promoted membrane, comprising:
   (a) an ethylene-propylene-diene rubber (EPDM); and
   (b) incorporated within the rubber, 1 to 10 wt. %, based on the amount of promoted membrane, of an adhesion promoter, the adhesion promoter comprising a polyester resin having a hydroxyl number within the range of 28 to 250 mg KOH/g, a content of terephthalate recurring units within the range of 40 to 65 wt. % based on the amount of polyester resin, and a glass-transition temperature within the range of 40° C. to 80° C.; wherein the polyester resin comprises 20 to 50 wt. %, based on the amount of polyester resin, of recurring units of neopentyl glycol
   wherein the promoted membrane is suitable for use in single-ply roofing applications.

2. The membrane of claim 1 comprising EPDM having a tensile strength of at least 1000 psi by ASTM D-412-68, an elongation of at least 250% by ASTM D-412-68, a Die C tear resistance of at least 100 lb./in.-min., and a Shore A hardness within the range of 45 to 75 units.

3. The membrane of claim 1 comprising 1.5 to 8 wt. % of the adhesion promoter.

4. The membrane of claim 1 wherein the polyester resin has a hydroxyl number within the range of 40 to 230 mg KOH/g.

5. The membrane of claim 1 wherein the polyester resin has a hydroxyl number within the range of 56 to 112 mg KOH/g.

6. The membrane of claim 1 wherein the polyester resin has an average hydroxyl functionality within the range of 2 to 6.

7. The membrane of claim 1 wherein the polyester resin has a content of terephthalate recurring units within the range of 45 to 60 wt. %.

8. The membrane of claim 1 wherein the polyester resin has a glass-transition temperature within the range of 50° C. to 70° C.

9. The membrane of claim 1 wherein the polyester resin has an acid number less than 15 mg KOH/g.

10. The membrane of claim 1 wherein the polyester resin further comprises at least 1 wt. % of recurring units of a hydroxy-functional or acid-functional crosslinker.

11. The membrane of claim 10 wherein the acid-functional crosslinker is trimellitic anhydride.

12. The membrane of claim 10 wherein the hydroxy-functional crosslinker is trimethylolpropane.

13. The membrane of claim 1 further comprising one or more additives selected from the group consisting of pigments, mineral fillers, carbon blacks, clays, cryogenically ground rubber, ground coal, processing oils, waxes, stearic acid, vulcanizing agents, vulcanization promoters, activators, accelerators, green strength promoters, antioxidants, plasticizers, fire retardants, and combinations thereof.

14. The membrane of claim 1 having at least a 25% improvement in adhesion to a roof substrate when used in combination with a two-component polyurethane adhesive when compared with the adhesion of a similar membrane made without the adhesion promoter.

15. A roofing system comprising:
   (a) a roof deck;
   (b) insulation affixed to the roof deck;
   (c) a promoted membrane of claim 1; and
   (d) an adhesive;

wherein the adhesive bonds the promoted membrane to the insulation.

16. The roofing system of claim 15 wherein the adhesive is a non-foaming, low-VOC two-part polyurethane adhesive.

17. The roofing system of claim 16 wherein the adhesive comprises a reaction product of (a) a "B side" comprising (i) from about 5 wt. % to about 20 wt. % non-polyester polyol; (ii) from about 80 wt. % to about 95 wt. % aliphatic polyester polyol having a hydroxyl number within the range of 150 to 300 mg KOH/g and an average hydroxyl functionality of about 1.8 to 2.2; and (iii) less than 1 wt. % catalyst, based on the weight of the B-side components; and (b) an "A side" comprising (i) from about 80 wt. % to about 92 wt. % of at least one polyisocyanate, and (ii) from about 8 wt. % to about 20 wt. % of a non-reactive plasticizer based on the weight of the A side components; wherein the "B side" and "A side" are reacted at a volume ratio of about 1:1, and the adhesive is formulated at an NCO/OH index within the range of 0.90 to 1.10.

* * * * *